July 16, 1957  E. P. D'AZZO  2,799,464
CANOPY AND AWNING MOULDING AND SUPPORTS
Filed June 10, 1952
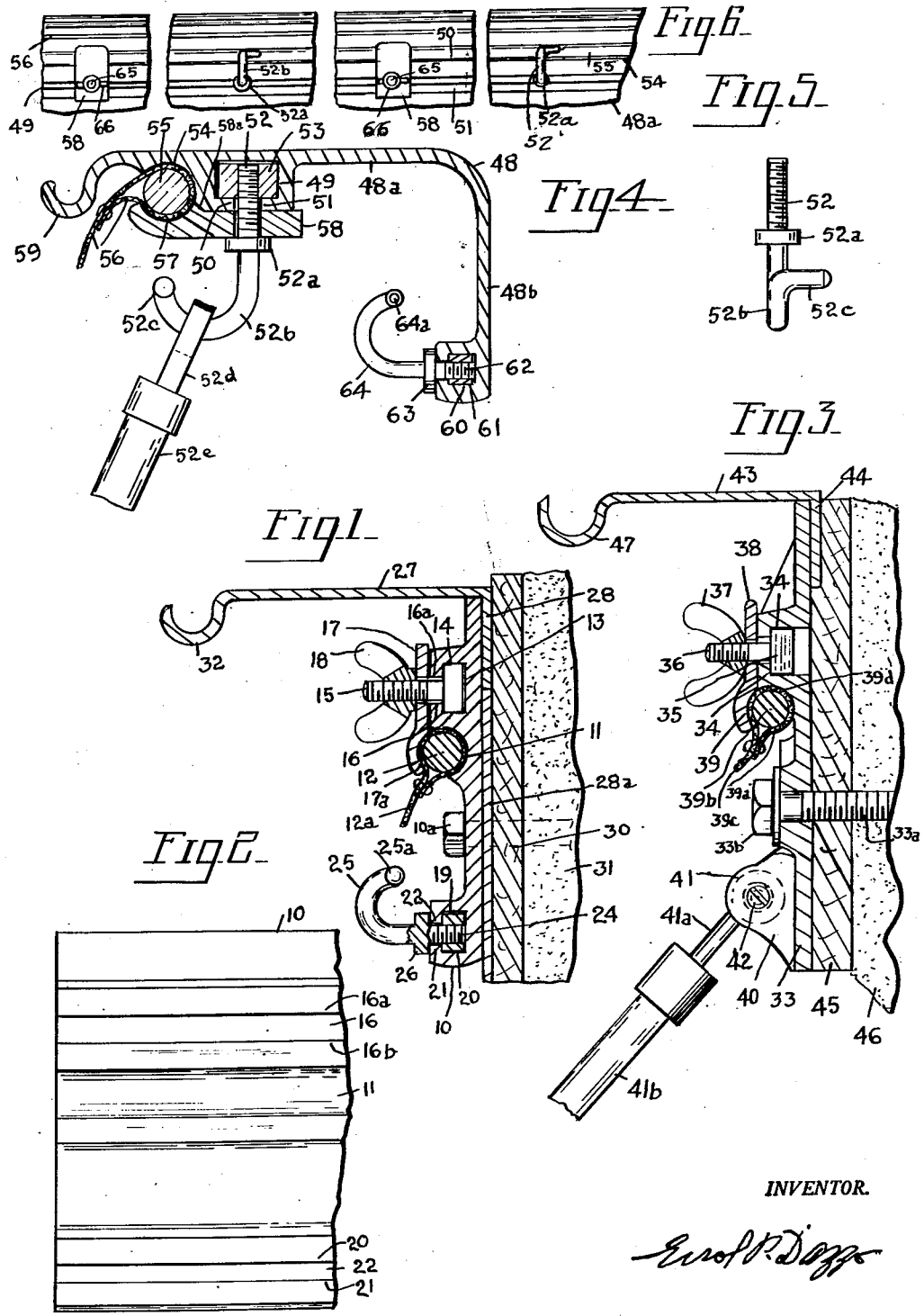
INVENTOR.
E. P. D'Azzo

United States Patent Office 2,799,464
Patented July 16, 1957

2,799,464

CANOPY AND AWNING MOULDING AND SUPPORTS

Errol P. D'Azzo, Brooklyn, N. Y.

Application June 10, 1952, Serial No. 292,701

5 Claims. (Cl. 248—273)

This invention relates to a moulding for awnings and canopies, which is constructed to provide continuous grooved support for clamps to hold head rod and canvas assembly, and to hold rafters in a common wall mounting, so arranged that the attachment of the wall equipment will not be dependent upon locations conditioned by defective brick or wall construction, but may be determined by best service positions, the moulding having such large area of contact with the building wall that secure connection between the moulding and the wall may be established.

Another object of the invention is to provide a wall moulding for supporting awnings and canopies, which can be constructed by the extrusion process, and which will provide dependable support for the head rod and the canvas or fabric looped around and secured to the head rod, and also provide an easily hookable connection for the rafter bar.

A still further object of the invention is the provision of an extruded moulding having a wall engaging wing or portion and a ceiling forming wing or portion, the ceiling wing being formed with a longitudinal groove to receive the head rod and the looped canvas or textile material, and provided with means for clamping this canvas covered head rod in place, so that no openings are left for insects and particularly mosquitoes to enter the store or building equipped with the awning or canopy, a complete insect seal being established between the fabric and the moulding.

A still further object of the invention is to provide a moulding which can be secured to a wall, and which is constructed to clamp the canvas covered head rod and also clamp or support the rafter, so that labor can be saved.

With the above and other objects in view the invention comprises certain new and useful constructions, combinations and arrangements of parts, clearly described in the following specifications and fully illustrated in the drawings, in which:

Fig. 1 is a vertical sectional view showing an extruded moulding, having a separate ceiling wing part, showing the combined head rod and rafter holding assembly.

Fig. 2 is a front elevation of the moulding, all clamp parts being removed.

Fig. 3 is a vertical sectional view of a casting, showing a combined head rod and rafter assembly, using a screw pin for the latter.

Fig. 4 is a vertical sectional view showing an extruded moulding having a wall wing section or part and a ceiling wing section or part, the latter being constructed to clamp the head rod thereto so as to establish a closed seal against insects, and to provide external drainage.

Fig. 5 is a detail side elevation of a rafter connecting hook, showing a terminal stop.

Fig. 6 is a bottom plan view of the extruded moulding shown in section in Fig. 4, on a reduced scale, and broken away to illustrate alternating group clamping devices.

Referring to Figs. 1 and 2 of the drawings, 10 designates an extruded moulding, which may be of aluminum or other suitable material or metal, and which is constructed with a longitudinal semi-circular seat or groove 11 to receive the head rod 12, on which the canvas or textile 12a is looped.

The moulding 10 is also formed with a longitudinal T-shaped groove 13, which is disposed parallel to the seat 11, and shown to be located above this seat, and in this T-shaped groove 13 the square head 14 of the bolt shank 15 is slidably mounted. This shank works between the confronting guide flanges 16 and 16a of the groove 13. On the shank 15 the clamping bar 17 is mounted, and this is formed with a concave terminal jaw 17a, which has pressure engagement with the canvas covered head rod 12, when the wing nut 18 is threaded on the shank against the clamping bar 17.

The moulding 10 is also formed with a longitudinal T-shaped groove 20 providing parallel guide flanges 21 and 22. In this groove the square nut 19 slides, and this nut is engaged by the threaded shank 24 of the hook 25. The hook is formed with an integral collar or shoulder 26, which has pressure engagement with the outer faces of the guide flanges 21 and 22, when the threaded shank 24 is tightened in the nut 19, and at the same time this nut is clamped against the inner faces of the flanges 21 and 22. The hook 25 is formed with a terminal stop 25a, designed to resist accidental displacement of the rafter eye, when subjected to lifting wind movement or pressure.

In Fig. 1 I show a ceiling wing 27, formed of rolled or molded sheet metal, such as aluminum or otherwise, having a longitudinal flange 28, which is secured between the moulding 10 and the wood board 30, in the usual manner. A filler sheet 28a is used between the moulding 10 and the board 30, which is suitably mounted on the building wall 31. The ceiling wing 27 is formed with a longitudinal drainage trough 32, which is supported well forwardly of the moulding and the equipment mounted thereon.

In Fig. 3 I show the combined assembly of the head rod clamp and the rafter support in connection with a cast wall plate 33, which is formed with an integral socket 34 in which the square head 35 of the bolt shank 36 is mounted, by insertion of the shank through the socket, which is cast open at the back to receive the head 35. On this bolt shank 36 the wing nut 37 is threaded against the clamping bar 38, mounted on the shank 36. The bar 38 is formed with a terminal concave jaw 39, which has pressure engagement with the head rod 39b, having the canvas or fabric covering 39a looped around the same and extended therefrom as at 39c. The head rod 39b engages the concave seat 39d formed in the casting 33, which is located adjacent to the socket 34.

The casting plate 33 is formed with forwardly offset bracket flanges 40, which receive the terminal eye 41 of the rod 41a, of the rafter bar 41b. A screw or pin 42 is extended across the flanges 40 and through the terminal eye 41 to hold the rafter bar in end coupled position. A ceiling wing 43, having an inner flange 44, is secured between the casting plate 33 and the wood board 45, against the wall 46. The ceiling wall 43 is extended forwardly and is formed with a longitudinal drainage groove or eave 47.

In Fig. 4 I show an extruded moulding 48 having a wall wing or section 48b and a ceiling wing or section 48a, integral with and substantially perpendicular to each other. The ceiling wing or section is formed with a longitudinal T-shaped groove 49, which is provided with confronting guide flanges 50 and 51, between which the threaded shank 52 extends to engage the square nut 53 disposed in the groove 49. The shank 52 is formed with an integral collar or shoulder 52a, which has pressure engagement with the clamp bar 58, mounted on the shank 52, and this bar has pressure engagement with the guide flanges 50 and 51, when the shank 52 is threaded tight in the nut 53, and when this is done the nut will be clamped against the inner sides of the guide flanges 50 and 51. The clamp bar 58 is formed with a terminal concave jaw 57 to engage the fabric tube 56 which encloses the head rod 55. The ceiling wing is formed with a longitudinal concave or semi-circular seat 54, which snugly receives the fabric covered head rod 55. The clamp bar 58 is formed with a transverse rib 58a which has a snug pressure fit between the fabric covered head rod 55 and the seat 54, to establish a direct metal-to-metal pressure seating engagement.

The ceiling wing or section 48a is extended forwardly and formed with a longitudinal drainage trough or eave 59, which is located forwardly of the head rod 55.

The shank 52 is formed with an integral hook 52b, having a terminal stop 52c, shown in Fig. 5 more fully, and this hook is adapted to receive the terminal eye 52d of the rafter bar 52e.

The wall wing or section 48b is formed with a longitudinal groove 60 of T-shaped construction, in which the square nut 61 is slidably mounted. This nut is engaged by the threaded shank 62, which is formed with an integral collar 63, and a hook 64, having a terminal lateral stop 64a. By tightening the shank 62 in the nut 61 the nut and the collar are forced into clamping engagement with the guide flanges 60a and 60b of the groove 60.

Due to the terminal stop on the end of the hook the connecting eye of a rafter bar of twelve feet or other considerable length may be connected with the hook from a side walk or ground position, without using a ladder, and readily disconnected by a slight twist of the pole to cause the terminal connecting eye to pass the terminal hook stop. But the terminal connecting eye cannot be displaced by wind movement which tends to raise the canvas and the connecting parts, as the eye will be restrained from complete separation from the hook by engagement with the terminal eye. It is not possible for the wind to produce the required twisting action on the terminal connecting eye to cause complete separation.

In Fig. 6, in a reduced bottom plan, I show a general arrangement for the use of the extruded moulding. A series of clamp bars 58 are arranged against the T-shaped groove 49, being clamped in place by means of the hook bolts 52b, to hold the head rod 55 in the seat 54 of the extruded moulding. In alternating arrangement with the hook bolts wing nuts 66 are arranged to engage the bolts 65, which extend through corresponding clamp bars 58. Each of the bolts 65 is provided with a head to engage the T-shaped slot guide flanges 50 and 51.

By this arrangement perfect alignment, based on factory construction, is established for all of the clamps which hold the head rod and the canvas or fabric which covers it, so that mis-alignment is effectively prevented, and well installed and nicely hung canopy is obtained, which adds beauty and neatness to the store front.

In the construction shown in Fig. 4, the hook 64 may be used for the holding of the rafter bar in place, when traffic conditions or the general arrangement of a given store front advises a more innermore location for the mounting of the rafter bar.

In this construction the clamping of the head rod does not call for the turning of the bolt and the bracket or receiving part at the same time, as the wing nut is turned on the bolt in one case, and in the other case the bolt hook may be turned against a stationary nut. In both cases the bolts are slidably mounted on the extrusion moulding, for relative longitudinal adjustment, so that the positions of the clamps does not depend on wall anchors.

Having described my invention I claim as patentable:

1. A wall moulding for installation of an awning or canopy having a head rod and rafter bars terminating in rafter eyes, comprising a plate having a building wall engaging section and a ceiling section, said ceiling section extending forwardly in an approximately horizontal plane substantially perpendicular to the building wall engaging section, said ceiling section being provided with a pair of longitudinally extending flanges defining a concave seat and a groove having a T-shaped cross section, said groove and seat extending longitudinally and parallel to each other, a clamping bar disposed in pressure engagement with said flanges, said clamping bar being provided with a concave jaw, the concave jaw being disposed in opposition to the concave seat to engage a fabric covered head rod, a nut sliding lengthwise in the T-shaped groove, and a shank having threaded engagement with the nut and provided with a thrust collar to engage the clamping bar, said shank being provided with a hook for receiving a rafter eye, said hook having a terminal stop to prevent wind displacement of the rafter eye from said hook.

2. A wall moulding according to claim 1, wherein said ceiling section is formed with a longitudinally extending eave provided with a drainage trough.

3. A wall moulding according to claim 1, wherein said building wall engaging section is provided with another pair of longitudinally extending flanges defining a second longitudinally extending groove having a T-shaped cross section, another nut slidably disposed in the second groove, and another shank having threaded engagement with said other nut, said other shank having a thrust collar engaging said other flanges, said other shank being provided with another rafter eye receiving hook having a terminal lateral stop thereon.

4. A moulding for supporting an awning having a head rod and a rafter bar having a rafter eye, comprising a plate provided with a plurality of longitudinally extending flanges defining a concave seat and a pair of grooves each having a T-shaped cross section, said grooves and seat extending longitudinally and parallel to each other, a clamping bar disposed in pressure engagement with one pair of said flanges, said clamping bar being provided with a concave jaw, the concave jaw being disposed in opposition to the concave seat to engage said head rod, a threaded member slidably disposed in one of the grooves underlying the clamping bar and provided with means to engage the clamping bar, a nut slidably disposed in the other of said grooves, and a shank having threaded engagement with said nut and provided with a thrust collar to engage another pair of said flanges, said shank being provided with a hook for receiving said eye said hook having a terminal lateral stop to prevent lateral displacement of the rafter eye from the hook.

5. A moulding according to claim 4, wherein said threaded member is another nut, and said means is another shank having threaded engagement with said other nut and provided with a thrust collar engaging said clamping bar, said other shank being provided with another rafter eye receiving hook having a terminal lateral stop.

References Cited in the file of this patent

UNITED STATES PATENTS

| | | |
|---|---|---|
| 683,248 | Chase | Sept. 24, 1901 |
| 866,093 | Verdin | Sept. 17, 1907 |
| 960,771 | Astrup | June 7, 1910 |
| 1,813,525 | Astrup | July 7, 1931 |
| 2,639,809 | Perry et al. | May 26, 1953 |